United States Patent [19]

Talbot

[11] Patent Number: 4,777,378

[45] Date of Patent: Oct. 11, 1988

[54] INFORMATION HANDLING AND CONTROL SYSTEMS, MANUALLY OPERABLE ELECTRICAL SWITCHES FOR USE IN SUCH SYSTEMS, AND METHODS OF TESTING SUCH SWITCHES IN SUCH SYSTEMS

[75] Inventor: Kevin T. Talbot, Lichfield, England

[73] Assignee: Salplex Limited, England

[21] Appl. No.: 54,488

[22] Filed: May 27, 1987

[30] Foreign Application Priority Data

Jun. 11, 1986 [GB] United Kingdom ............... 8614198

[51] Int. Cl.⁴ .................... G08B 1/08; H01H 1/04
[52] U.S. Cl. ...................... 307/10 R; 200/263; 340/537
[58] Field of Search ............. 307/10 R; 200/5 A, 11, 200/263, 264, 265; 340/500, 517, 537, 538

[56] References Cited

U.S. PATENT DOCUMENTS

| | | | |
|---|---|---|---|
| 2,915,728 | 12/1959 | Page et al. | 338/190 |
| 3,646,552 | 2/1972 | Fuhr | 340/510 |
| 3,988,556 | 10/1976 | Hyodo | 200/264 |
| 4,028,620 | 6/1977 | Kitagawa et al. | 307/10 R X |
| 4,055,772 | 10/1977 | Leung | 307/10 R |
| 4,118,700 | 10/1978 | Lenihan | 340/537 X |
| 4,242,546 | 12/1980 | Alonso | 200/264 X |
| 4,398,144 | 8/1983 | Heidemann | 324/527 |
| 4,491,828 | 1/1985 | Galvin et al. | 340/537 X |
| 4,616,216 | 10/1986 | Meirow et al. | 340/500 X |

FOREIGN PATENT DOCUMENTS

| | | |
|---|---|---|
| 1412298 | 11/1975 | United Kingdom . |
| 2013402 | 8/1979 | United Kingdom . |
| 2049290 | 12/1980 | United Kingdom . |
| 2078006 | 12/1981 | United Kingdom . |
| 2077506 | 12/1981 | United Kingdom . |
| 2155223 | 9/1985 | United Kingdom . |
| 2159285 | 11/1985 | United Kingdom . |
| 2192742 | 1/1988 | United Kingdom . |

OTHER PUBLICATIONS

Ingenieurs de L'Automobile, No. 8, Nov. 1984, pp. 71-78, Paris, France, P.-J. Salvay, "Le Multiplexage Lucas".

GEC Review, vol. 2, No. 1, 1986, pp. 32-36, Chelmsford, Essex, GB, W. R. Betts, "Multiplexing for the Automotive Industry".

*Primary Examiner*—Bentsu Ro
*Attorney, Agent, or Firm*—Kirschstein, Kirschstein, Ottinger & Israel

[57] ABSTRACT

A manually operable electrical toggle switch (60) is connected in a low current signalling link (40) via a non-intelligent slave unit (20) in a time slot assignment multiplex system for automotive vehicles to an intelligent master unit (10) which in response to a binary input from the switch (60) provides an output signal on such a signalling link (40) to control high current to a load (70) connected to a slave unit (20). The switch (60) has conductive plastics contacts (63) to avoid oxide corrosion problems and may be all plastics. The binary input from the switch (60) is provided by one of two resistances (R2 or R3) which are distinguishable in the master unit (10) from each other and from both a short circuit and an open circuit in the signal line (42) of the link (40). The condition of the switch (60) and its wiring (27) to the slave unit (20) may thus be diagnosed without manual operation of the switch as a programmable function of the master unit (10), via the master unit by a tester (80) or via the slave unit (20) by a tester (90) prior to assembly in the complete system.

11 Claims, 1 Drawing Sheet

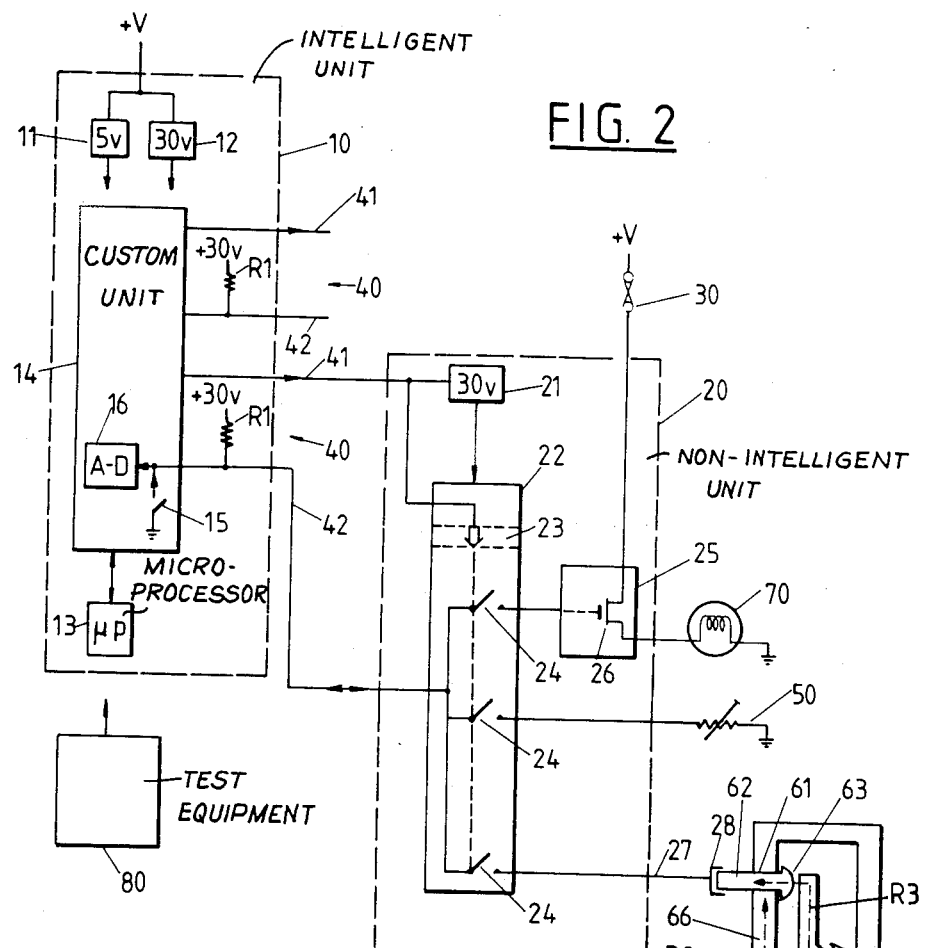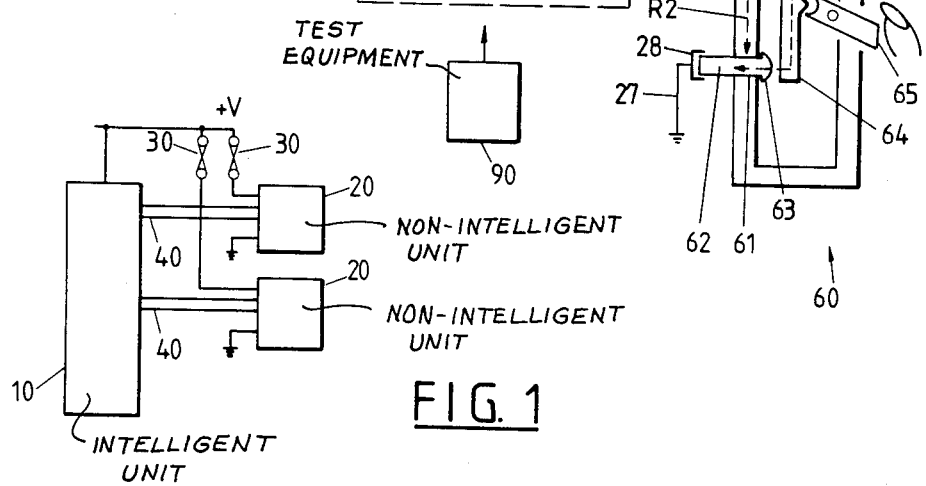

INFORMATION HANDLING AND CONTROL SYSTEMS, MANUALLY OPERABLE ELECTRICAL SWITCHES FOR USE IN SUCH SYSTEMS, AND METHODS OF TESTING SUCH SWITCHES IN SUCH SYSTEMS

BACKGROUND OF THE INVENTION

1. Field of the Invention

This invention relates to information handling and control systems, manually operable electrical switches for use in such systems, and methods of testing such switches in such systems.

In particular this invention relates to an information handling and control system in which a manually operable electrical switch is provided in a low current signalling link to an intelligent unit which recognizes a binary input signal from the switch and in response provides an output signal in a low current signalling link to power switching means to control a high current to a load, and in which the switch includes two terminals and a conductive member which is movable such that in normal operation the resistance between two terminals with the movable member in a respective first or second position is recognized in the intelligent unit as a respective first or second condition of the binary input signal from the switch.

2. Description of the Related Art

An example of such a system in the form of an automotive vehicle electrical system is known from the article "Multiplexing for the automotive industry" by W. R. Betts in GEC REVIEW, Vol. 2, No. 1, 1986 at pages 32 to 36.

In such a known system if the manually operable switches are of conventional form, then in each switch a metal pin provides each of the two terminals and its respective contact and the movable member connects or disconnects the two contacts to provide short circuit resistance of open circuit resistance between the two terminals which is recognized as the respective first or second condition of the binary input signal from the switch.

A problem with conventional switch contacts, normally of copper, is the build up of oxide corrosion over a period of time. If the switch contacts are directly connected to the load which they control and carry the same high current, then making and breaking this high current helps to prevent oxidation build up. However, this protection is not available in systems of the type to which this invention relates in which the switch indirectly controls its associated load and is included in a low current signalling link. Precious metal contacts, normally gold plating, can be used to overcome the oxidation problem but this is expensive and can be unacceptably so in extremely cost sensitive very large scale mass produced systems such as automotive vehicle electrical systems. The low current signalling links in systems of the type to which this invention relates may operate at low voltage, for example 5 volts or 12 volts. These low voltages will not provide any significant protection against switch contact oxidation. The system described in the above-mentioned GEC REVIEW article uses a higher voltage of 30 volts on the low current signalling links and it is mentioned in the article that this use of 30 volts should reduce the need for precious metal contacts. However, it is considered that there may still be a long term oxidation problem.

An object of the invention is substantially to overcome the above-discussed problem of switch contact oxidation, and the invention is based on the realization that in systems of the type to which this invention relates it is not necessary that when the movable member connects the two switch contacts the condition of the binary input signal from the switch which is to be recognized must correspond to short circuit resistance between the two terminals.

According to the invention there is provided an information handling and control system as described in the second paragraph of this specification, characterized in that the switch includes two conductive plastics members each of which provides one of the two terminals and its respective contact, the movable member being arranged to connect the two contacts in said first position such that said first condition of the binary input signal from the switch is distinct from a short circuit condition in the signalling link to the intelligent unit.

An automotive vehicle electrical system may include an information handling and control system as described in the previous paragraph.

According to the invention there is also provided a switch for use in a system as described in either of the two previous paragraphs, the switch including said two conductive plastics members and said movable conductive member.

In a system according to the invention the switch may include a resistive member permanently connecting the two terminals, in said first position of the movable member said resistance between the two terminals being substantially that of the conductive plastics contacts and the movable member, and in said second position of the movable member said resistance between the two terminals being substantially that of the permanently connected resistive member such that said first and second conditions of the binary input signal from the switch are distinguishable from each other and from both said short circuit condition and an open circuit condition in the signalling link to the intelligent unit.

According to the invention there is also provided a switch for use in a system as just described, the switch including said two conductive plastics members, said movable conductive member and said permanently connected resistive member.

In the switch described in the preceding paragraph the permanently connected resistive member may be provided by a conductive plastics body portion of the switch which locates said two conductive plastics members providing the terminals and contacts.

In a switch according to the invention the movable member may be conductive plastics.

A switch according to the invention may be a toggle switch providing only one said binary input signal in response to which the intelligent unit provides an off-off said output signal for the high current to said load.

A switch according to the invention may be all plastics.

In a system according to the invention, said low current signalling link to an intelligent unit will preferably include said manually operable switch, a local unit associated with said switch and wiring from said switch to said local unit.

According to the invention there is also provided a method of testing said switch and said wiring in a system as just described without involving manual operation of the switch, in which method a fixed voltage supply is applied via the intelligent unit to said signalling link including said switch, and in which a voltage value at the intelligent unit responsive to the application of said fixed voltage supply and dependent on the electrical resistance of the signalling link is checked to determine whether the switch is in said respective first or second condition, or said wiring is short circuited, or said wiring is broken.

According to the invention there is also provided a method of testing said switch and said wiring before assembly with said local unit in a system as described in the penultimate paragraph and without involving manual operation of the switch, in which method a fixed voltage supply is applied from test equipment via the local unit to said switch, and in which a voltage value at the test equipment responsive to the application of said fixed voltage supply and dependent on the electrical resistance of said wiring and between the two terminals is checked to determine whether the switch is in said respective first or second condition, or said wiring is short circuited, or said wiring is broken.

The ability to test the satisfactory condition of the switch and its wiring without involving manual operation of the switch is clearly advantageous, and particularly such testability during the manufacture of very large scale mass produced systems, for example automotive vehicle electrical systems, can provide considerable cost saving.

BRIEF DESCRIPTION OF THE DRAWINGS

The invention will now be described in more detail with reference to the accompanying drawings, in which:

FIG. 1 is an overall schematic diagram of an information handling and control system for an automotive vehicle electrical system of the type to which the invention relates, and FIG. 2 shows details of the system of FIG. 1 incorporating the features of the invention.

DETAILED DESCRIPTION OF THE PREFERRED EMBODIMENTS

Referring now to FIG. 1, there is shown a star wired system with an intelligent, central, master unit 10 and a number of non-intelligent, local, slave units 20. Power from a battery +V is supplied to the master unit 10 and via fuses 30 to the slave units 20. A low current signalling link 40 is connected from the master unit 10 to each slave unit 20. Manually operable electrical switches, sensors, and high current loads (not shown in FIG. 1) are connected to the slave units 20 and their interaction is controlled from the master unit 10 by means of time slot assignment multiplex.

Referring now to FIG. 2, the master unit 10 includes 5 volt and 30 volt power supplies 11,12 fed by the battery +V which is 12 volts in an automotive vehicle electrical system. The power supplies 11,12 are fed to a microprocessor 13 and a custom unit 14 connected thereto in the master unit 10. Each low current signalling link 40 to a slave unit 20 includes a clock pulse line 41 and a signal line 42. The clock pulses on the lines 41 are of 30 volts amplitude and control the timing of the system time slot assignment multiplex. In each time slot a switch 15 in the custom unit 14 connected to each signal line 42 controls the application to that signal line 42 of zero volts or the fixed voltage supply of 30 volts via a respective pull-up resistor R1.

In each slave unit 20, one of which is shown in FIG. 2, a 30 volt power supply 31 is derived from the clock pulses on the line 41. A demultiplexing unit 22 has timing circuits 23 responsive to the clock pulses on the line 41 and from which switches 24 are operated to connect the low current signalling link of the signal line 42 through a corresponding channel in the appropriate time slot. Each slave unit 20 can connect for example sixteen channels, three of which are shown in FIG. 2.

A variable resistive sensor 50 is shown wired to one of the channels in the slave unit 20. With the sensor 50 connected in the signal line 42 during the appropriate time slot and the switch 15 in the master unit 10 open during that time slot, then the voltage on the signal line 42 is an input signal from the sensor 50 due to its resistance, and this input signal is recognised via an analogue-to-digital converter 16 in the master unit 10.

A manually operable electrical toggle switch 60 is shown wired to another of the channels in the slave unit 20. With the switch 60 connected in the signal line 42 during the appropriate time slot and the switch 15 in the master unit 10 open during that time slot, then the voltage on the signal line 42 due to the resistance between two terminals of the switch 60 is recognised via the analogue-to-digital converter 16 in the master unit 10 as a respective first or second condition of a binary input signal from the switch 60.

Another of the channels in the slave unit 20 is shown connected in the slave unit to an output circuit 25. The state of the switch 15 during the appropriate time slot will provide an output signal on the signal line 42 to power switching means 26 in the output circuit 25 to control a high current from the battery +V via a fuse 30 to a load 70, for example a lamp, wired to the slave unit 20. The microprocessor 13 in the master unit 10 ensures that the output signal on a signal line 42 to control a high current to a particular load 70 connected to any one of the slave units 20 is in response to a input signal from a particular switch 60 which is to be associated with that load 70 and is connected to any one of the slave units 20.

The low currents in the low current signalling links of the system, for example through the signal line 42 when it includes the switch 60 may be, for example, not greater than 5 mA. The high currents through the loads of the system, for example to the load 70 controlled in response to operation of the switch 60, may be, for example, up to 10 amps.

Referring again to the switch 60, the wiring 27 from the slave unit 20 to the switch 60 is connected via two connector contacts 28 to two respective pin members 61 of the switch 60. The two pin members 61 consist of conductive plastics and each provides one of two terminals 62 and its respective contact 63. A movable conductive member 64 consists of conductive plastics and is arranged via plastics manually operable means 65 so that in a first position, as shown in the drawing, it connects the two contacts 63 and in a second position it does not connect those two contacts. A body portion 66 of the switch which locates the two pin members 61 also consists of conductive plastics. The switch 60 may be all plastics.

Conductive plastics materials that is to say plastics loaded with conductive material for example silver, gold, copper or carbon, are well known and the loading can be chosen to provide a required volume resistivity over a wide range which includes the requirements described below.

The conductive plastics body portion 66 of the switch which locates the two pin members 61 provides a resistive member permanently connecting the two terminals 62 as shown by the dotted line and having a resistance R2. When the movable member 64 is in its second position and does not connect the two contacts 63 then the resistance between the two terminals 62 is substantially R2. When the movable member 64 is in its first position connecting the two contacts 63, then the movable member 64 and the two contacts 63 provide a resistance R3, as shown by the dotted line, which is in parallel with the resistance R2. The volume resistivities of the conductive plastics materials forming the body portion 66, the pin members 61 and the movable member 64 are chosen such that when the movable member is in its first position then the resistance between the two terminals 62 is substantially R3, and such that the first and second conditions of the binary input signal from the switch 60 which correspond to the first and second positions of the movable member 64 and are recognised in the master unit 10 via the analogue-to-digital converter 16 are distinguishable from each other and from both a short circuit condition and an open circuit condition in the signalling link of the line 42 to the master unit 10.

Examples of suitable resistance values could be R2=1 Kohms and R3=10 ohms, or R2=100 Kohms R3=100 ohms. It is envisaged that a resistance value for R3 could be up to approximately 1 Kohm and still be distinguishable in the master unit 10 from a short circuit condition in a low current signalling link including the switch 60. In this case, even if the other resistance R2 is not provided, the conductive plastics contacts 63 will not have the oxide corrosion problems associated with metal contacts in conventional switches.

One possible variation in the construction of the switch 60 is to have the movable conductive member of metal as in conventional switches. In this case the volume resistivity chosen for the conductive plastics of the pin members 61 will be suitably adjusted in order that they alone provide the required resistance value for R3. Another possible variation is that instead of the resistance R2 being provided by the body portion 66, the body of the switch can be of insulating plastics and the resistance R2 can be provided by a resistor which is printed between the pin members 61 either on the inside surface or the outside surface of the body portion 66.

If the switch 60 is all plastics, this can have a considerable cost advantage particularly in very large scale mass produced systems, for example automotive vehicle electrical systems, both in the cost of manufacture of the switches and in the cost of the total amount of metal used in the electrical system compared with the use of conventional switches. It is envisaged that it may be possible further to provide a plastics connector block for the switch 60 in which the connector contacts 28 are of suitably loaded conductive plastics, and it is conceivably possible further to provide the wiring 27 from the contacts 28 to the local slave unit 20 as suitable loaded conductive plastics or other mouldable non-metal conductive material. If the switch 60, the connector block including the contacts 28, and the wiring 27 could be provided as a single non-metal mouldable unit then the cost advantage in very large scale mass produced systems would be very considerably enhanced.

When the complete information handling and control system as described above has been manufactured and installed, for example as part of an automotive vehicle electrical system, then all the items connected to the local slave units 20, that is sensors 50, switches 60 and loads 70 may be tested via the central master intelligent unit 10. In vehicles with driver information displays the test function can be incorporated within the master unit 10 as a programmable function of the microprocessor 13. Otherwise, the vehicle builder or vehicle servicer can perform these tests with test equipment 80 when connected to the master unit 10.

The provision of the switch 60 having the two resistances R2 and R3 now enables a method of testing the switch 60 and the wiring 27 in a system as described above without involving manual operation of the switch 60, in which method the fixed voltage supply of +30 volts is applied under control of the tester 80 via the resistor R1 in intelligent master unit 10 to the signal line 42 of the signalling link 40 including the switch 60, and in which a voltage value at the master unit 10 responsive to the application of that fixed voltage supply and dependent on the electrical resistance of the signalling link is checked to determine whether the switch 60 is in its first or second condition, or the wiring 27 is short circuited, or the wiring 27 is broken.

Before the complete information handling and control system as described above has been manufactured and installed, for example during the manufacturing stages of an automotive vehicle, then each of the items connected to one local slave unit 20, that is a selection of sensors 50, switches 60 and loads 70 may be tested using test equipment 90 connected to that slave unit 20.

The provision of the switch 60 having the two resistances R2 and R3 now enables a method of testing the switch 60 and the wiring 27 before assembly with said local unit 20 in a system as described above and without involving manual operation of the switch 60, in which method a fixed voltage supply is applied from the test equipment 80 via the local slave unit 20 to said switch 60, and in which a voltage value at the test equipment 80 responsive to the application of that fixed voltage supply and dependent on the electrical resistance of the wiring 27 and between the two terminals 62 of the switch 60 is checked to determine whether the switch 60 is in its first or second condition, or the wiring 27 is short circuited, or the wiring 27 is broken.

The ability to test the satisfactory condition of the switch 60 and its wiring to the slave unit 20 without involving manual operation of the switch, particularly as part of a manufacturing stage of the complete system can provide considerable cost saving in very large scale mass produced systems.

If the switch 60 does not have the resistance R2, then the resistance R3 is still useful in testing. That is to say that if a short circuit condition is detected in the signalling link including the switch, then this fault cannot be in the switch and can therefore be traced elsewhere.

The information handling and control system can have application other than to automotive vehicle electrical systems, for example to domestic appliances such as washing machines or to industrial control systems such as for heating and ventilation.

I claim:

1. An information handling and control system in which a manually operable electrical switch is provided in a low current signalling link to an intelligent unit which detects a binary input signal from the switch and in response provides an output signal in said or another low current signalling link to a power switching means to control a high current load, in which the switch includes two terminals having contacts and a conductive member which is movable such that in normal operation the resistance between the two terminals with the movable conductive member in a respective first or second position is detected in the intelligent unit as a respective first or second condition of the binary input signal from the switch, characterized in that the switch includes two conductive plastic members, each of which provides one of the two terminals and its respective contact, the movable conductive member being arranged to connect the two contacts in said first position such that said first condition of the binary input signal from the switch is distinct from a short circuit condition in the signalling link to the intelligent unit.

2. A system as claimed in claim 1, in which the switch includes a resistive member permanently connecting the two terminals, in which in said first position of the movable member, the resistance between the two terminals is substantially equal to that of the conductive plastic members and the movable conductive member, and in which in said second position of the movable conductive member, the resistance between the two terminals is substantially equal to that of the permanently connected resistive member such that said first and second conditions of the binary input signal from the switch are distinguishable from each other and from both said short circuit condition and an open circuit condition in the signalling link to the intelligent unit.

3. A system as claimed in claim 2, in which the signalling link including said switch comprises a local unit and wiring from said switch to said local unit.

4. A manually operable electrical switch for use in an information handling and control system of the type in which the switch is provided in a low current signalling link to an intelligent unit which detects a binary input signal from the switch and in response provides an output signal in said or another low current signalling link to a power switching means to control a high current load, said switch comprising:
(A) two terminals having contacts;
(B) a conductive member movable such that in normal operation the resistance between the two terminals with the movable conductive member in a respective first or second position is detected in the intelligent unit as a respective first or second condition of the binary input signal from the switch;
(C) two conductive plastic members, each of which provides one of the two terminals and its respective contact; and
(D) said movable conductive member being arranged to connect the two contacts in said first position such that said first condition of the binary input signal from the switch is distinct from a shortcircuit condition in the signalling link to the intelligent unit.

5. A switch as claimed in claim 4, the switch including a resistive member permanently connecting the two terminals, in which in said first position of the movable conductive member, the resistance between the two terminals is substantially equal to that of the conductive plastic members and the movable conductive member, and in which in said second position of the movable conductive member, the resistance between the two terminals is substantially equal to that of the permanently connected resistive member such that said first and second conditions of the binary input signal from the switch are distinguishable from each other and from both said short circuit condition and an open circuit condition in the signalling link to the intelligent unit, said switch including said two conductive plastic members, said movable conductive member and said permanently connected resistive member.

6. A switch as claimed in claim 5, in which the permanently connected resistive member is provided by a conductive plastic body portion of the switch which locates said two conductive plastic members providing the terminals and contacts.

7. A switch as claimed in claim 4, in which the movable conductive member is constituted of conductive plastic.

8. A switch as claimed in claim 4, in which the switch is a toggle switch providing said binary input signal in response to which the intelligent unit provides said output signal for the high current load.

9. A switch as claimed in claim 4, in which the manually operable switch is all constituted of plastic.

10. In an information handling and control system in which a manually operable electrical switch is provided in a low current signalling link to an intelligent unit which detects a binary input signal from the switch and in response provides an output signal in said or another low current signalling link to a power switching means to control a high current load, in which the signalling link including said switch comprises a local unit and wiring from the switch to the local unit, and in which the switch includes two terminals having contacts, two conductive plastic members each providing one of the two terminals and its respective contact, a conductive member which is movable such that in normal operation the resistance between the two terminals with the movable conductive member in a respective first or second position is detected in the intelligent unit as a respective first or second condition of the binary input signal from the switch, said movable conductive member being arranged to connect the two contacts in said first position such that said first condition of the binary input signal from the switch is distinct from a short circuit condition in the signalling link to the intelligent unit, and a resistive member permanently connecting the two terminals, in which in said first position of the movable conductive member, the resistance between the two terminals is substantially equal to that of the conductive plastic members and the movable conductive member, and in which in said second position of the movable conductive member, the resistance between the two terminals is substantially equal to that of the permanently connected resistive member such that said first and second conditions of the binary input signal from the switch are distinguishable from each other and from both said short circuit condition and an open circuit condition in the signalling link to the intelligent unit, said switch including said two conductive plastic members, said movable conductive member and said permanently connected resistive member, a method of testing said switch and said wiring without involving manual operation of the switch, said method comprising the steps of:
(A) applying a fixed voltage supply via the intelligent unit to said signalling link including said switch; and
(B) checking a voltage value at the intelligent unit responsive to the application of said fixed voltage supply and dependent on the electrical resistance of the signalling link to determine whether said switch is in said respective first or second condition, or said wiring is shortcircuited, or said wiring is broken.

11. In an information handling and control system in which a manually operable electrical switch is provided in a low current signalling link to an intelligent unit which detects a binary input signal from the switch and in response provides an output signal in said or another low current signalling link to a power switching means to control a high current load, in which the signalling link including said switch comprises a local unit and wiring from the switch to the local unit, and in which the switch includes two terminals having contacts, two conductive plastic members each providing one of the two terminals and its respective contact, a conductive member which is movable such that in normal operation the resistance between the two terminals with the movable conductive member in a respective first or second position is detected in the intelligent unit as a respective first or second condition of the binary input signal from the switch, said movable conductive member being arranged to connect the two contacts in said first position such that said first condition of the binary input signal from the switch is distinct from a short circuit condition in the signalling link to the intelligent unit, and a resistive member permanently connecting the two terminals, in which in said first position of the movable conductive member, the resistance between the two terminals is substantially equal to that of the conductive plastic members and the movable conductive member, and in which in said second position of the movable conductive member, the resistance between the two terminals is substantially equal to that of the permanently connected resistive member such that said first and second conditions of the binary input signal from the switch are distinguishable from each other and from both said short circuit condition and an open circuit condition in the signalling link to the intelligent unit, said switch including said two conductive plastic members, said movable conductive member and said permanently connected resistive member, a method of testing said switch and said wiring before assembly with said local unit without involving manual operation of said switch, said method comprising the steps of:

(A) applying a fixed voltage supply from test equipment via the local unit to said switch; and (B) checking a voltage value at the test equipment responsive to the application of said fixed voltage supply and dependent on the electrical resistance of said wiring and between the two terminals to determine whether the switch is in said respective first or second condition, or said wiring is shortcircuited, or said wiring is broken.

* * * * *